United States Patent [19]

Miko

[11] 4,233,883
[45] Nov. 18, 1980

[54] AUTOMATICALLY SELF-ADJUSTING AND LOAD-LIMITING SWAYBRACE SYSTEM

[75] Inventor: Richard J. Miko, Paramus, N.J.

[73] Assignee: Edo Corporation, College Point, N.Y.

[21] Appl. No.: 2,734

[22] Filed: Jan. 11, 1979

[51] Int. Cl.³ .......................... B64D 1/04; F41F 5/02
[52] U.S. Cl. ............................... 89/1.5 B; 244/137 R
[58] Field of Search ............. 89/1.5 B, 1.5 R, 1.5 G; 244/137 R

[56] References Cited

U.S. PATENT DOCUMENTS

| | | | |
|---|---|---|---|
| 1,528,942 | 3/1925 | Moser | 89/1.5 B |
| 2,010,511 | 8/1935 | Crawford | 89/1.5 B |
| 2,461,406 | 2/1949 | Birk et al. | 89/1.5 B |
| 2,526,903 | 10/1950 | Ruppert | 89/1.5 B |
| 2,552,578 | 5/1951 | O'Mara et al. | 89/1.5 B |
| 3,670,620 | 6/1972 | Paraskewik | 89/1.5 B |
| 3,967,528 | 7/1976 | Baker | 89/1.5 B |
| 4,122,754 | 10/1978 | Panlagui et al. | 89/1.5 B |
| 4,168,046 | 9/1979 | Hasquenoph et al. | 89/1.5 B X |

FOREIGN PATENT DOCUMENTS

| | | | |
|---|---|---|---|
| 440156 | 12/1935 | United Kingdom | 89/1.5 B |
| 577186 | 5/1946 | United Kingdom | 89/1.5 B |
| 1248926 | 10/1971 | United Kingdom | 244/137 R |

*Primary Examiner*—David H. Brown
*Attorney, Agent, or Firm*—Davis, Hoxie, Faithfull & Hapgood

[57] ABSTRACT

A swaybrace system includes one or more pairs of opposing swaybrace arms that pivot in relation to aircraft structure, each arm with a pad thereon automatically being biased by a spring-loaded wedge or the like to cause the pad to contact with the store under all load conditions. Each arm in one embodiment is bifurcated into upper and lower portions capable of flexing, the store-contacting pad being attached to the lower portion, with the lower portion flexing with respect to the upper portion through a predetermined distance Sa for pad loads between zero and a predetermined pre-load. The upper portion, together with the lower portion and pad, flexes about the wedge through a predetermined distance Sb for pad loads between the predetermined pre-load and a predetermined maximum load. An alternate embodiment utilizes resilient means between the pad and arm to allow the pad to move through the predetermined distance Sa with respect to the arm, the arm together with the pad flexing about the wedge through the predetermined distance Sb, all under corresponding load conditions. Distance Sa equals distance SB in each embodiment. Each embodiment automatically loads itself to obtain adequate but not excessive store pre-loads at each pad, to properly restrain the store but limit maximum hook loads.

14 Claims, 5 Drawing Figures

AUTOMATICALLY SELF-ADJUSTING AND LOAD-LIMITING SWAYBRACE SYSTEM

BACKGROUND OF THE INVENTION

This invention relates to a swaybrace system which automatically applies and maintains a desired predetermined preload condition on a store (a bomb, rocket, fuel tank, etc.) suspended on an airborne ejector rack to hold the store securely while at the same time limiting the amount of load which is induced on the ejector rack hook which must be overcome during the act of store release. For example, in any given installation of a store on an ejector rack, the store must be held securely by lateral restraints, commonly swaybrace arms, to prevent store yaw and roll excursions which might induce aircraft wing/pylon vibrations and thus fatigue the aircraft structure and result in airframe in-flight failure. In addition, it is necessary to prevent store oscillations when considering such stores as rocket pods or bombs, since undue motion of the pods or bombs during a firing or ejection would disturb the aim of the rocket or bomb. Further, the mechanism which applies the store restraints must not, in executing its function, induce such reactive loads in the ejector rack between the rack hook and store lug, that the hook is prevented from opening to release the store when commanded to do so. Finally, it is advantageous that the application of the lateral restraints to the store during the act of store loading be automatic so that loading time and ground crew tasks are minimized.

In the prior art, the methods of accomplishing the above noted functions have included purely manually emplaced lateral restraints, and automatically applied restraints with limited capabilities. In the former, the lateral restraints consist of pairs of swaybrace arms integral with the ejector rack (or pylon or aircraft directly) near the fore and aft ends. These arms accommodate varying size stores by virtue of bolt-on loadbearing pads on the ends of the swaybrace arms. These pads are manually torqued down onto a suspended store to make hard contact. The amount of force exerted on the store by the pads is governed by the bolt torque applied. It is time-consuming, and not always an easy task, to apply the exact correct torque to properly restrain the store but limited to prevent hook and lug lockup.

Automatic self-adjusting swaybrace systems have embodied various mechanisms consisting of cams, wedges or like devices which function to bias the swaybrace arms down to make contact with the store surface itself through pads on the arms or pads emplaced on the store surface. These mechanisms in some instances force contact of the restraining swaybrace arms as a gap develops under one swaybrace arm due to store rolling motion in a direction opposite or away from that particular restraint. These automatic swaybrace systems can be grouped in two broad categories; those wherein the two arms of a pair, either fore or aft, are actuated independently, and are free to take up clearance independently, and those wherein the two arms of a pair are linked together so that one can take up clearance only if the other can also move. For those which act independently, excessive pre-load can develop, because as a store rolls from side to side relative to the rack creating a gap between it and the swaybrace arm pads, the arms take up the gap successively until large loads are developed at the pads. These loads are reacted by the rack hooks, which in turn are unable to open due to hook/lug friction. Swaybraces which act independently as a pair cannot take up any gap which arises as a result of store roll, since the heavily loaded swaybrace arm remains in contact with the store and prevents the opposite unloaded arm from dropping down to take up the clearance. This latter class of automatic swaybrace mechanism also cannot exert appreciable pre-load on a store, since it is limited by whatever spring force is available to actuate its wedges or cams. This force is usually quite small and well below the 1000 pound per arm pad pre-load order of magnitude which is required. Thus, this type mechanism cannot develop sufficient loads to deform thin skinned stores to the point where the skin contacts the internal structure, resulting in a very loosely restrained stores. Hence, one class of self-adjusting swaybrace system develops loads which are too large and prevent hook opening, while the other develops no appreciable pre-load so that stores hang too loosely and endanger aircraft flight or accurate store aiming.

The following patents represent prior art known to applicant pertaining to these and various other similar or more unrelated systems for restraining stores, namely: U.S. Pat. Nos. 1,528,942; 1,784,011; 2,010,511; 2,451,481; 2,461,406; 2,526,903; 2,552,578; 2,822,207; 2,889,746; 3,056,623; 3,500,716; 3,598,341; 3,670,620; 3,784,132; 3,840,201; 3,942,749; 3,967,528; 4,050,656; and British Pat. No. 440,156. None of these patents disclose or suggest the automatically self-adjusting and load-limiting swaybrace system of the present invention, to automatically obtain and automatically maintain a predetermined preload condition.

SUMMARY OF THE INVENTION

The present invention consists of an automatically self-adjusting and load limiting swaybrace system designed to automatically develop the proper predetermined amount of store pre-load force (pre-load condition) from an initial no-load condition in order to provide safe carriage of the store, and to automatically maintain this pre-load force following maximum load conditions so as to limit the maximum load developed at the store lug/hook connection so that proper lug/hook functioning is not affected. In the context of this description, the no-load condition refers to the load condition at the store-contacting pads when they are merely touching the store to maintain contact without applying significant force thereto. The pre-load condition refers to the predetermined equilibrium load condition at both the store-contacting pads under which the store is not exposed to excessive inertial forces tending to move the store against one of the pads and away from the other pad, and at which the store is sufficiently but not excessively restrained so as not to create excessive lug/hook forces. The maximum load condition refers to the load condition at a pad when the maximum predetermined excessive inertial force for which the system is designed is created by the store moving against that pad.

The application of proper pre-load and limiting of maximum hook reactive load in the present invention is obtained by the swaybrace arm design functioning with any one of a number of automatic self-adjusting biasing sources such as cams, wedges, springs, or the like, the arm design accounting for the mechanical and metallurgical properties of its material in a manner which results in the desired load/deflection characteristics. An alternate embodiment of the present invention incorporates additional components into a different arm design to accomplish the aforesaid desired load/deflection characteristics, for use in a situation where envelope, dimension, size or weight restrictions are imposed by the ejector rack or related structure.

In each embodiment of the present invention, each swaybrace arm of a pair of arms is pivotally mounted and the biasing means associated with each arm automatically biases the arm toward the store so that each pad maintains contact with the store under no-load, predetermined pre-load and predetermined maximum load conditions. Means associated with each arm automatically permit each pad to obtain and maintain the predetermined pre-load condition, the pre-load condition initially being obtained from the no-load condition after store attachment to the ejector rack without external manual influence or perturbation inherent during store loading onto the rack. When both pads are at the pre-load condition and the store rolls to create a maximum load condition on one pad, a no-load condition is created at the opposite pad; when the store rolls back to an equilibrium condition, both pads return to the same predetermined pre-load condition. These results are obtained by automatically providing for each pad to move a predetermined distance Sa toward and away from at least a portion of the adjacent end of its arm, in operating between the no-load condition and the predetermined pre-load condition; and by automatically providing for the at least a portion of the adjacent end of the arm to move, along with its pad, through a predetermined distance Sb equal to Sa, in operating between the predetermined pre-load condition and the predetermined maximum load condition.

DESCRIPTION OF EMBODIMENTS

Figure 1:
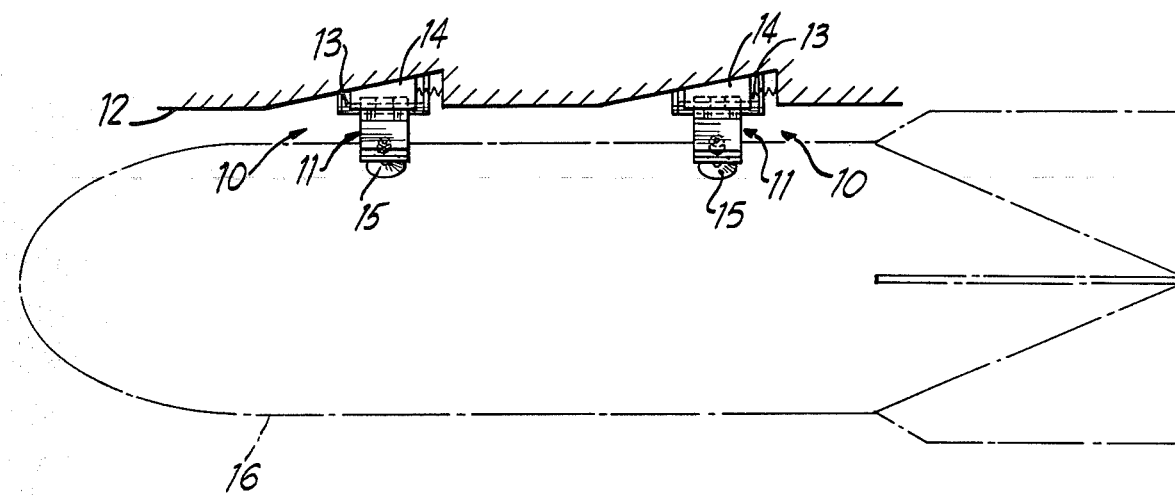
FIG. 1 is a side-elevational view of the swaybrace system of the present invention in connection with a store, an arm of each of two pairs of opposing swaybrace arms being shown.

Referring now to the drawings, swaybrace system 10 of the present invention is illustrated having one or more pairs of opposing swaybrace arms 11 pivotally connected to aircraft structure 12, by pin 13 connected to the aircraft structure and passing through an opening in each arm 11. The arms 11 may be pivotally connected directly to the aircraft, or pivotally connected to the nylon or ejector rack associated with the aircraft, and the term aircraft structure accordingly is intended to mean any of these. Biasing means 14 associated with each arm, which may be a spring-loaded wedge, cam, or the like, is supported by aircraft structure 12 and automatically biases each arm 11 in a downward direction whereby store-contacting and load distributing pads 15, attached to each arm 11 opposite the pivoting end, contact store 16 under no-load, pre-load and maximum load conditions. The biasing means 14 do not move upwardly in response to loads on pads 15.

Figure 2:
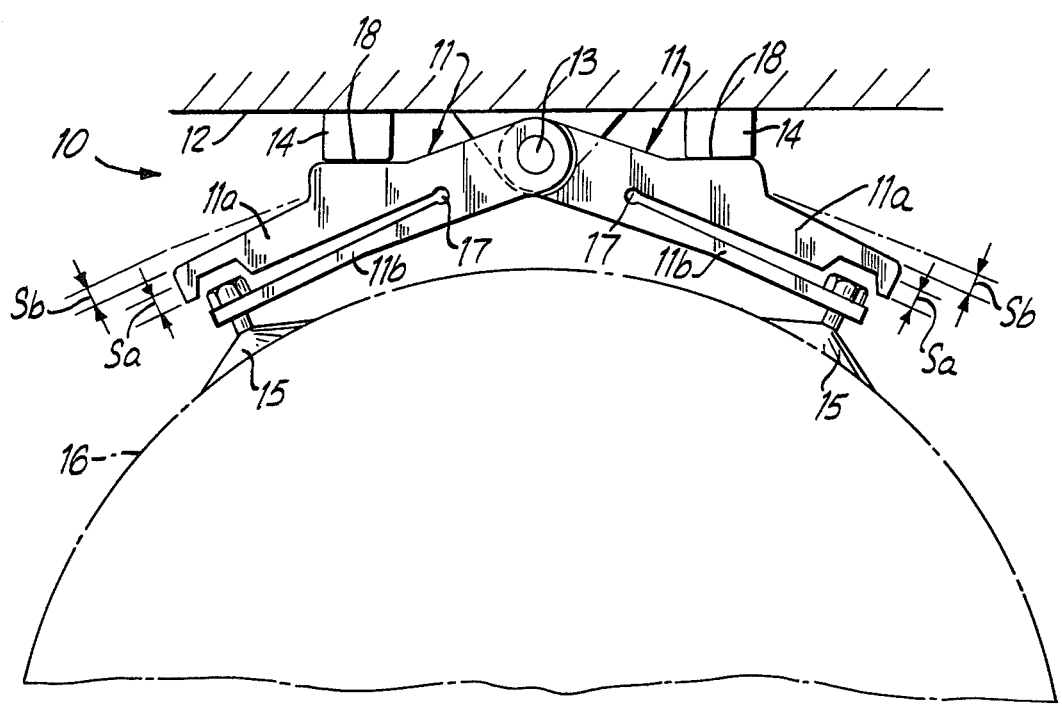
FIG. 2 is a view of the swaybrace system of the present invention along the longitudinal axis of the store, illustrating the no-load condition.
Figure 3:
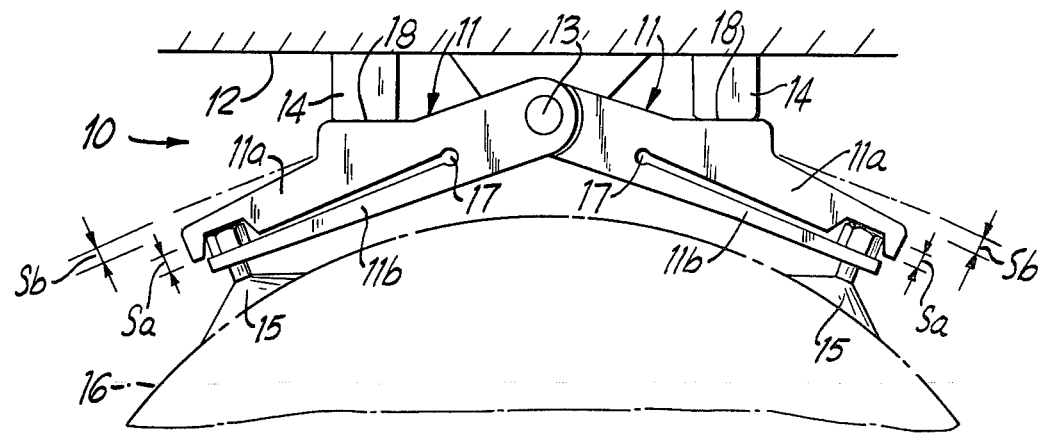
FIG. 3 is a view corresponding to FIG. 2, illustrating the pre-load condition.
Figure 4:
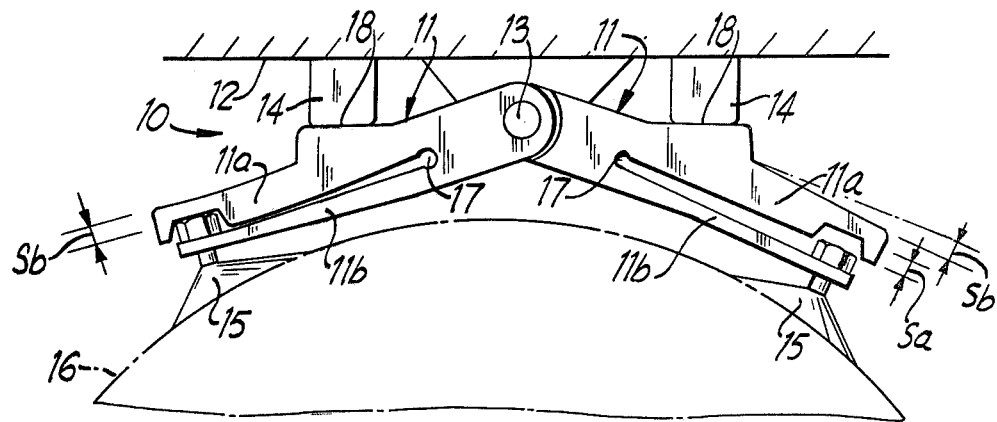
FIG. 4 is a view corresponding to FIG. 2, illustrating a maximum load condition; and, FIG. 5 is a view corresponding to FIG. 2 and illustrating an alternate embodiment of the present invention in the no-load condition.

In FIGS. 2 to 4, the end of each arm 11 is shown bifurcated into an upper arm portion 11a and a lower arm portion 11b, both capable of flexing, with the pad 15 attached to lower arm portion 11b. As to each arm 11, lower arm portion 11b is designed such that under the influence of the predetermined value of pre-load at pad 15, the end of 11b can flex or bend about point 17 such that the predetermined gap Sa is automatically taken up. Any further load on pad 15 automatically deflects the ends of upper arm portion 11a and lower arm 11b by flexing together as a unit about point 18, that being the point of contact of biasing means 14 with arm 11, since biasing means 14 does not move upwardly in response to the pad load. The flexing or bending moment of inertia of arm 11 is designed such that the end of the upper arm portion 11a automatically moves the predetermined distance Sb under the maximum load condition at pad 15, that being the largest load the pad 15 is expected to experience in flight. When the end of upper arm portion 11a is occasioned to move upwardly through the distance Sb under the maximum load condition, it is apparent that the end of lower arm portion 11b moves through the distance Sa, plus the distance Sb along with the end of upper arm portion 11a, since it is the store acting against pad 15 that brings about this motion. In the present invention, the upper and lower arm portions are designed such that distance Sa equals distance Sb.

Under the above description and criteria, the functioning of the swaybrace system operates in a manner now to be described, the arms 11 being designed for example to obtain and maintain a 1000 pound pre-load condition, and experience a 10,000 pound maximum load condition. FIG. 2 illustrates the system no-load condition, wherein a lug (not shown) on store 16 has been connected to a hook (not shown) on the ejector rack or aircraft. Biasing means 14 such as spring-loaded wedges have placed pads 15 of each arm in contact with store 16, without applying significant force thereto. When an initial force, say for example the conventional pre-load force of 1000 pounds, is applied to one of the pads 15 of FIG. 2, the left pad for example, as by a store shift toward that pad in flight, the end of lower arm portion 11b associated with that pad automatically moves upward by flexing the distance Sa. Since the right pad 15 is now unloaded, biasing means 14 automatically causes the entire arm 11 associated with that pad to pivot downwardly (through a distance Sa) so that the right pad 15 remains in contact with the store and the gap Sa remains on the right side. When this store force on the left pad 15 is relaxed and the store returns to a center position of equilibrium by rolling toward the right pad 15, right lower arm 11b will deflect to obtain a condition whereby the ends of both lower arm portions 11b (and thus both pads 15) have moved upwardly by flexing a distance of ½ Sa toward upper arm portions 11a. This loading process continues in this manner as the store shifts back and forth with respect to pads 15, and the pre-load condition of FIG. 3 at each pad is quickly and automatically obtained wherein the ends of both lower arm portions 11b (and thus both pads 15) have each moved the distance Sa toward upper arm portions 11a so that no further upward motion of a pad 15 with respect to an upper arm portion 11a is permitted. At this condition, each pad has the pre-load force of 1000 pounds on it.

By way of another example of the pre-load condition of FIG. 3 being obtained from the no-load condition of FIG. 2, the maximum force of 10,000 pounds is applied to the left pad 15 for example, again by the store shifting toward that pad in flight. Under this circumstance the end of lower arm portion 11b associated with the left pad 15 automatically moves upward by flexing the distance Sa, and the lower arm portion 11b and upper arm portion 11a then automatically move upward by flexing the additional distance Sb. The right pad 15 is now unloaded, and biasing means 14 automatically causes the entire arm 11 associated with that pad to pivot downwardly (through a distance Sa plus Sb) so that right pad 15 remains in contact with the store and the gap Sa remains on the right side. When the store force on the left pad 15 is relaxed and the store returns to a center position of equilibrium by rolling toward the right pad, the ends of the left upper and lower arm portions 11a and 11b relax to move downwardly through the distance Sb, and the right lower arm portion 11b is deflected to move upwardly through the distance Sa, which is equal to distance Sb, both pads 15 now being at the predetermined pre-load condition shown in FIG. 3 and with a 1000 pound force on each pad. It will be apparent that this pre-load condition is obtained automatically and solely through the design of the swaybrace system of the present invention.

FIG. 4 shows a maximum load condition occurring at the left pad 15, for example, after the pre-load condition of FIG. 3 has been obtained. Here, the maximum store force of 10,000 pounds has acted on the left pad 15 to automatically move the ends of upper and lower arm portions 11a and 11b associated with that pad upwardly by flexing through the distance Sb. The unloaded end of lower arm portion 11b associated with right pad 15 now has relaxed to automatically move downward by flexing through the distance Sa, and right pad 15 remains in contact with the store so that biasing means 14 cannot act to pivot the entire right arm 11 any further in a downward direction. When the maximum store force on the left pad 15 is relaxed, the store again returns to a center position of equilibrium by rolling toward the right pad 15. The left upper and lower arm portions 11a and 11b relax to move downward by flexing through the distance Sb, and the right lower arm portion 11b is deflected to move upwardly through the distance Sa which is equal to distance Sb, both pads 15 thereby returning to the predetermined pre-load condition of FIG. 3 with a 1000 pound force on each pad. It therefore will be apparent that the predetermined pre-load condition will be maintained following a maximum load condition at a pad 15, to thereby limit the lug/hook load and prevent malfunctioning. Under the example given, the pre-load condition cannot exceed 1000 pounds when the store is centered and in equilibrium with the left and right pads 15. It will further be apparent that this result is obtained by virtue of predetermined distance Sa being equal to predetermined distance Sb.

It will be appreciated that in the design of such an automatically self-adjusting and load-limiting swaybrace system, the factors of store weight class, aircraft induced inertia loads, desired pre-load, store construction, rack hook opening force requirement, swaybrace arm material, and cross-section must be considered. The store weight and aircraft induced inertia loads determine the maximum load condition which the swaybrace arm must resist. Store construction determines what value of Sa must be designed into the swaybrace arm sufficient to deflect the outer skin of thin skinned stores into contact with their internal strongback. Hook opening force capability determines the allowable pre-load condition. The swaybrace arm material and cross-section allow the determination of the load/deflection properties of the arm such that it possesses sufficient strength and can deflect in two discrete motions of Sa and Sb. From the foregoing descriptions and definitions, it becomes apparent that the swaybrace arms may be designed to provide any desired load/deflection properties and different embodiments may be employed to achieve these same results.

Figure 5:
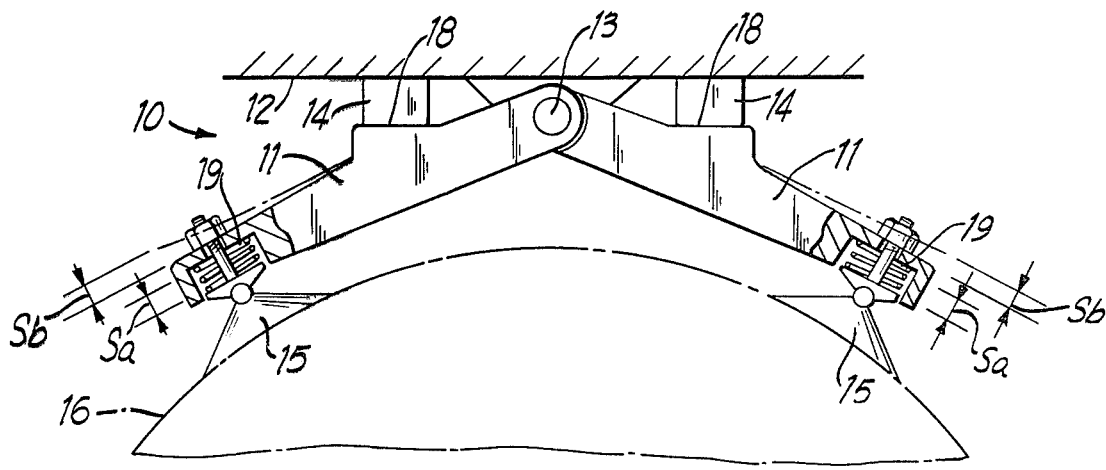

FIG. 5 shows an alternate embodiment, wherein the total cross-sectional height of the arm may be reduced and a savings in weight realized. Instead of the bifurcated arms of FIGS. 2-4, each arm is an integral member. Resiliently attached to the end of each arm 11 is a pad 15, by means of resilient belleville spring washer 19, for example, or like resilient means. The parts of FIG. 5 have like numbering to FIGS. 2-4, and the functioning is such that pads 15 automatically move through the distance Sa with respect to arm 11, by virtue of resilient means 19, in operating between the no-load condition and the predetermined pre-load condition. The end of arm 11 is capable of flexing to thereby automatically move through the distance Sb by flexing, in operating between the predetermined pre-load condition and the predetermined maximum load condition. The alternate embodiment of FIG. 5 otherwise functions in the exact same manner of FIGS. 2-4, distance Sa again being equal to distance Sb and the embodiment automatically obtaining and maintaining the pre-load condition.

It should be understood that modifications of the present invention may be made without departing from the spirit and scope of the invention as hereinafter claimed.

What is claimed is:

1. An automatically self-adjusting and load-limiting swaybrace system for use in conjunction with stores carried by an aircraft, comprising in combination: at least one pair of opposing swaybrace arms; each arm having means adjacent one end for pivotal connection to aircraft structure; store-contacting means attached to and positioned adjacent the opposite end of each arm; biasing means to be supported by aircraft structure and associated with each arm, for automatically biasing each arm toward the store whereby each store-contacting means maintains contact with the store under no-load, predetermined pre-load and predetermined maximum load conditions at the store-contacting means; each arm having means automatically permitting movement of its store-contacting means toward and away from at least a portion of the adjacent end of said arm through a predetermined distance Sa in operating between the no-load condition and the predetermined pre-load condition at its store-contacting means; each arm having means automatically permitting movement of said at least a portion of the adjacent end of said arm through a predetermined distance Sb in operating between the predetermined pre-load condition and the predetermined maximum load condition at its store-contacting means, said store-contacting means also moving in conjunction therewith through the predetermined distance Sb; and, the distance Sa being equal to the distance Sb; whereby, the predetermined pre-load condition may be automatically obtained and automatically maintained.

2. The invention defined in claim 1, having two pairs of opposing swaybrace arms.

3. The invention defined in claim 1, wherein, when the store-contacting means of both swaybrace arms are at their predetermined pre-load conditions, the store-contacting means of one swaybrace arm is free to move the predetermined distance Sa to the no-load condition at that store-contacting means when the store-contacting means of the opposing swaybrace arm moves the predetermined distance Sb to the predetermined maximum load condition at that store-contacting means.

4. The invention defined in claim 1, wherein the end of each swaybrace arm adjacent the store-contacting means is bifurcated into upper and lower arm portions each capable of flexing, the store-contacting means is attached to the lower arm portion, the lower arm portion capable of flexing provides the means automatically permitting movement of the store-contacting means through the predetermined distance Sa, and the upper arm portion capable of flexing comprises the said at least a portion of the adjacent end of said arm and provides the means automatically permitting movement through the predetermined distance Sb.

5. The invention defined in claim 4, wherein the biasing means associated with each arm comprises a bending point about which the upper arm portion may flex when moving through the predetermined distance Sb.

6. The invention defined in claim 1, wherein the means automatically permitting movement of the store-contacting means through the predetermined distance Sa comprises resilient means positioned between the store-contacting means and the adjacent end of said arm, and wherein the adjacent end of said arm is capable of flexing to provide the means automatically permitting movement of the adjacent end of said arm through the predetermined distance Sb.

7. The invention defined in claim 6, wherein the resilient means comprises a spring washer.

8. The invention defined in claim 4, wherein the biasing means associated with each arm comprises a bending point about which the adjacent end of said arm may flex when moving through the predetermined distance Sb.

9. For use in an automatically self-adjusting swaybrace system for stores carried by an aircraft, the system including biasing means to be supported by aircraft structure for automatically biasing each of a multiplicity of swaybrace arms toward the store in order for store-contacting means associated with each swaybrace arm to maintain contact with the store under all load conditions, the sub-combination comprised of: at least one pair of opposing swaybrace arms; each arm having means adjacent one end for pivotal connection to aircraft structure; store-contacting means attached to and positioned adjacent the opposite end of each arm; each arm having means automatically permitting movement of its store-contacting means toward and away from at least a portion of the adjacent end of said arm through a predetermined distance Sa in operating between the no-load condition and a predetermined pre-load condition at its store-contacting means; each arm having means automatically permitting movement of said at least a portion of the adjacent end of said arm through a predetermined distance Sb in operating between said predetermined pre-load condition and a predetermined maximum load condition at its store-contacting means, said store-contacting means also moving in conjunction therewith through the predetermined distance Sb; and, the distance Sa being equal to the distance Sb; whereby, the predetermined pre-load condition may be automatically obtained and automatically maintained.

10. The invention defined in claim 9, having two pairs of opposing swaybrace arms.

11. The invention defined in claim 9, wherein the end of each swaybrace arm adjacent the store-contacting means is bifurcated into upper and lower arm portions each capable of flexing, the store-contacting means is attached to the lower arm portion, the lower arm portion capable of flexing provides the means automatically permitting movement of the store-contacting means through the predetermined distance Sa, and the upper arm portion capable of flexing comprises the said at least a portion of the adjacent end of said arm and provides the means automatically permitting movement through the predetermined distance Sb.

12. The invention defined in claim 9, wherein, when the store-contacting means of both swaybrace arms are at their predetermined pre-load conditions, the store-contacting means of one swaybrace arm is free to move the predetermined distance Sa to the no-load condition at that store-contacting means when the store-contacting means of the opposing swaybrace arm moves the predetermined distance Sb to the predetermined maximum load condition at that store-contacting means.

13. The invention defined in claim 9, wherein the means automatically permitting movement of the store-contacting means through the predetermined distance Sa comprises resilient means positioned between the store-contacting means and the adjacent end of said arm, and wherein the adjacent end of said arm is capable of flexing to provide the means automatically permitting movement of the adjacent end of said arm through the predetermined distance Sb.

14. The invention defined in claim 13, wherein the resilient means comprises a spring washer.

* * * * *

UNITED STATES PATENT AND TRADEMARK OFFICE
CERTIFICATE OF CORRECTION

PATENT NO. : 4,233,883
DATED : Nov. 18, 1980
INVENTOR(S) : Richard J. Miko

It is certified that error appears in the above—identified patent and that said Letters Patent is hereby corrected as shown below:

In column 3, line 60, change "nylon" to --pylon--.

Change the dependency of claim 8 from "claim 4" to --claim 6--.

Signed and Sealed this

Tenth Day of March 1981

[SEAL]

Attest:

RENE D. TEGTMEYER

Attesting Officer     Acting Commissioner of Patents and Trademarks